Michael F. Murray
INVENTOR.

BY Clarence A. O'Brien
and Harvey B. Jacobson
Attorneys

Oct. 20, 1953 — M. F. MURRAY — 2,655,960
TREE FELLING APPARATUS, INCLUDING A PRIME MOVER-DYNAMO POWER PLANT
Filed March 14, 1950 — 2 Sheets-Sheet 2
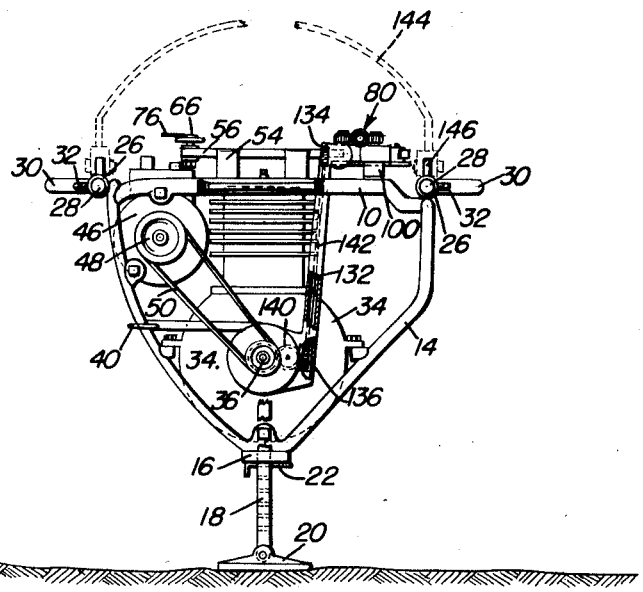
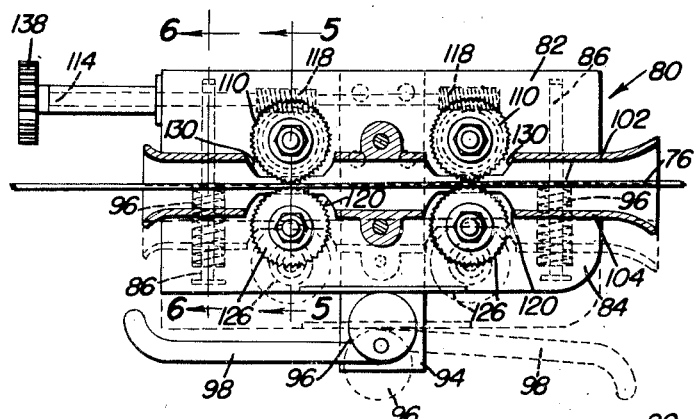
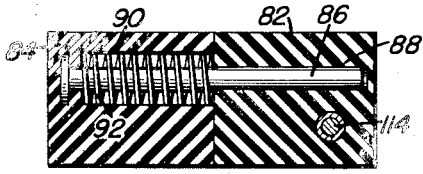
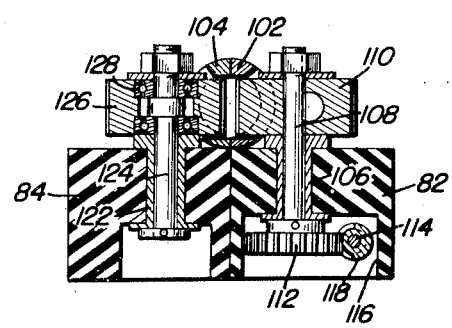
Michael F. Murray
INVENTOR.
BY Clarence A. O'Brien
and Harvey B. Jacobson
Attorneys Patented Oct. 20, 1953

2,655,960

UNITED STATES PATENT OFFICE 2,655,960

TREE FELLING APPARATUS, INCLUDING A PRIME MOVER-DYNAMO POWER PLANT

Michael F. Murray, Eureka, Calif.

Application March 14, 1950, Serial No. 149,554

6 Claims. (Cl. 144—34)

This invention relates to new and useful improvements in tree felling devices and the primary object of the present invention is to provide a tree feller embodying an electrically heated Nichrome wire for embracing and cutting through a tree.

Another very important object of the present invention is to provide a tree felling apparatus including a means for quickly and readily attaching the apparatus to a tree and a means for tightening a heated wire about the tree supporting the apparatus.

Another object of the present invention is to provide a tree felling device including a plurality of conveniently adjustable parts whereby the device is adaptable for use on trees of various diameters.

A further object of the present invention is the provision of a tree feller including a heated wire and a means for tightening the wire about a tree and composed of a wire moving mechanism having a pair of separable parts that are spread to accommodate the wire.

A still further aim of the present invention is to provide a tree felling device of the aforementioned character that is simple and practical in construction, strong and reliable in operation, small and compact in structure, inexpensive to manufacture and operate, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 3 is a rear elevational view of Figure 2;

Figure 4 is an enlarged plan view of the wire feeding or moving mechanism and showing in dotted lines the manner in which a wire is applied to the mechanism;

Figure 5 is an enlarged transverse vertical sectional view taken substantially on the plane of section line 5—5 of Figure 4;

Figure 6 is an enlarged sectional view taken substantially on the plane of section line 6—6 of Figure 4;

Figure 1:
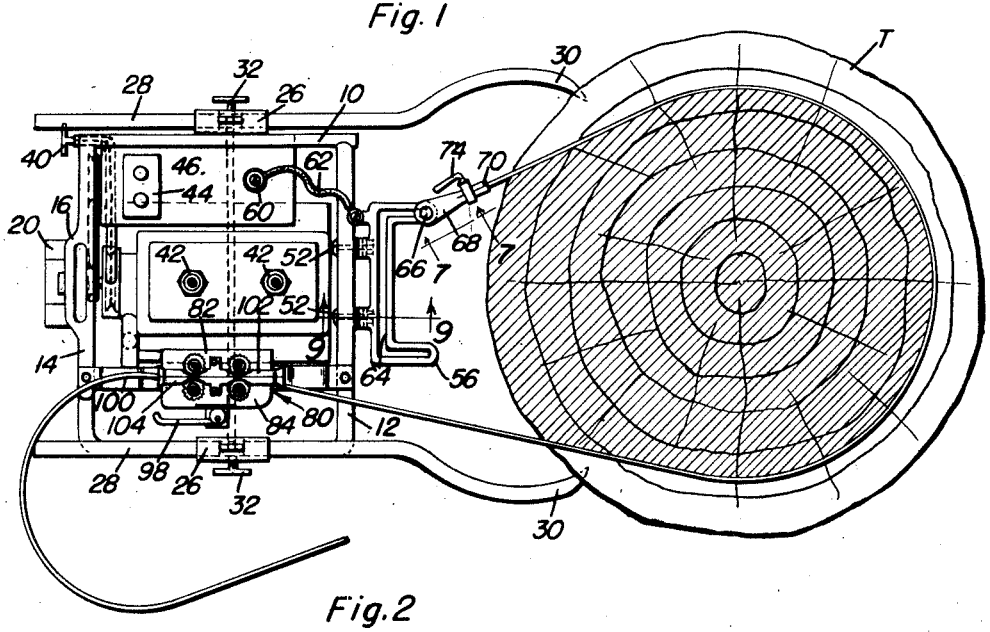
Figure 1 is a plan view of the present invention applied to a tree (shown in section)

Referring now to the drawings in detail, wherein, for the purpose of illustration, there is disclosed a preferred embodiment, the numeral 10 represents a frame having depending forward and rear end portions 12 and 14.

The rear portion 14 of the frame 10 is provided with a laterally projecting horizontal portion 16 having a slot 16a that slidably receives a supporting post 18 having a pivotal bearing foot 20 at its lower end. The portion 16 abuts a bolt or pin 22 that will enter a selected one of a plurality of vertically spaced apertures 24 formed in the post 18 for vertical adjustment of the frame 10.

Means is provided for securing the frame to a tree "T," and this means consists of a pair of spaced parallel sleeves 26 fixed on the frame and which slidably receive attaching arms 28 having pointed ends 30 for penetrating the tree. Set screws 32 threaded on the sleeves 26 are adjustable to bear against the arms 28.

A preferably gasoline motor 34 is supported solely on the frame 10 and more particularly the portions 12 and 14. This motor includes a drive shaft 36 supporting a pulley 38. The engine or motor 34 is provided with a starter handle 40 that is manually actuated for starting the engine. The spark plugs 42 of the engine 40 are electrically connected to a switch mechanism 44 suitably mounted on the frame.

A generator 46 is suitably supported on the frame 10 adjacent the motor 34 and includes a driven shaft on which there is mounted a pulley 48 that is connected to the pulley 38 by an endless belt 50.

Figure 9:
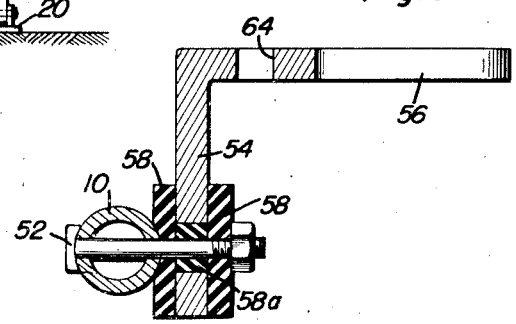
Figure 9 is an enlarged detail sectional view taken substantially on the plane of section line 9—9 of Figure 1.

The frame 10 supports a plurality of bolts 52 (Figure 9) that extend through the depending flanged portion 54 of a substantially U-shaped bucking head or plate 56. The flange 54 is insulated from the frame 10 and the bolts 52 by rubber washers 58 and 58a. The plate 56 is electrically connected to the terminal 60 of the generator 46 by a conductor 62.

Figures 2, 7, 8:
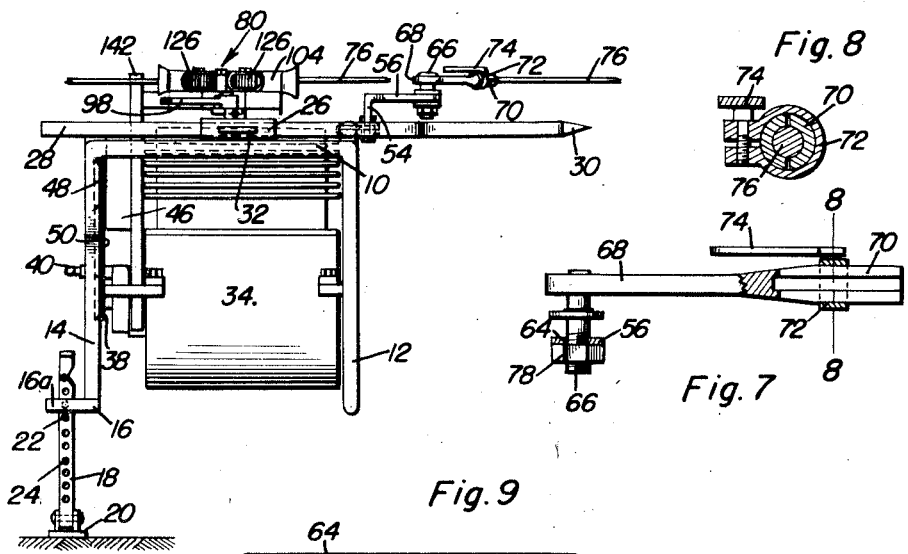
Figure 2 is a side elevational view of Figure 1.
Figure 7 (Sheet 1) is an enlarged detail view taken substantially on the plane of section line 7—7 of Figure 1 to show the means for attaching the cutting wire to the frame, and with parts broken away for the convenience of explanation.
Figure 8 is an enlarged sectional view taken substantially on the plane of section line 8—8 of Figure 7.

The plate 56 is provided with a U-shaped slot 64 that slidably receives a bolt 66 to which there is secured an arm 68 having a hollow slotted end 70. A split clamp 72 embraces the end 70 and is compressed by a bolt 74 that joins the ends of the clamp. One end of a Nichrome wire 76 is held within the end 70. A nut 78 (Figure 7) is threaded on the bolt 66 for adjusting the bolt 66 within the slot 64.

Means is provided for tightening the wire 76 about the tree "T," and this means consists of a wire pulling or moving mechanism 80, shown best in Figures 4, 5 and 6 of the drawings. The mechanism 80 includes a guiding member having first and second insulated halves 82 and 84.

Guide bolts 86 supported on and projecting laterally from the half 84 are slidably received in transverse bores 88 in the half 82. Elongated recesses 90 in the half 84, about the bolts 86, receive springs 92 about the bolts 86. The springs 92 are biased between the inner walls of the recesses 90 and the inner face of the half 82 to yieldingly urge the halves 82 and 84 apart.

An arm 94 projects laterally from the half 82 and underlies the half 84. An eccentric 96 is pivoted on the arm 94 and includes a hand grip 98 that is manually actuated to force the cam or eccentric 96 against the half 84 and thereby urge the half 84 against the half 82. The arm 94 is attached to a strap 100 mounted on the frame 10.

An elongated guide tube having outwardly flared end portions is supported on the mechanism 80 and includes similar longitudinal sections 102 and 104 that are secured to the halves 82 and 84, respectively.

A pair of vertically disposed bearings 106 are mounted on the half 82 and rotatably receive shafts 108 supporting drive gears or wheels 110 at their upper ends and further gears 112 at their lower ends. A driven shaft 114 extends through a recess 116 in the half 82 and supports worms 118 that engage the gears 112 in order to rotate the shafts 108. The toothed drive wheels 110 enter slots 120 provided in the section 104.

Another pair of vertically disposed bearings 122 are supported by the half 84 and receive shafts 124 on which there are mounted idler gears or toothed wheels 126. Bearing races 128, for the shafts 124, are mounted on the shafts 124 to permit free rotation of the wheels 126. The section 102 is provided with openings 130 receiving the wheels 126.

A drive connection is provided between the drive shaft of the motor 34 and the shaft 114 and includes a shaft '32 (Figure 3) having upper and lower worms 134 and 136 that engage gears 138 and 140 mounted on the shaft 114 and motor 34, respectively. The gear 140 is preferably connected to a further gear on the motor drive shaft. The parts 132, 134, 136 and 140 are enclosed within a protective casing 142.

A carrying bail 144 is attached to ears 146 rising from the sleeves 26 and constitutes a means whereby the device may be conveniently handled and carried.

In practical use of the present invention, the device is first set up relatively close to the tree "T," with the arms 28 adjusted until the prongs 30 enter the tree to steady the device.

Then, the hand grip 98 is moved to its dotted line position shown in Figure 4, to spread the halves 82 and 84, whereupon the free end of the wire 76 is passed through the sections 102 and 104, and between the wheels 110 and the wheels 126.

The hand grip 98 is next moved to its full line position of Figure 4 to clamp the halves 82 and 84 together and to cause the wire 76 to be gripped between the wheels 110 and 126.

The motor 34 is then started to cause electricity to pass through the generator 46 and into the wire 76 to heat the wire 76 intensely. As the wire 76 is heated, it is also pulled tightly about the tree "T" due to the wheels 110 and 126, and the wire will cut through the tree.

The tightening of the wire 76 about the tree is regulated in proportion to the heating of the wire, due to the gearing connecting the shaft 132 to the motor drive shaft.

Having described the invention, what is claimed as new is:

1. A tree falling apparatus comprising a frame, means for attaching the frame to a tree, a nichrome wire attached at one of its ends, to the frame means mounted on the frame and electrically connected to the wire for heating the wire, and means supported on the frame and engaging the other end of the wire for tightening the wire about a tree, said attaching means including a pair of arms having terminal prongs for penetrating a tree, a pair of spaced parallel sleeves fixed on said frame slidably receiving said arms, and set screws threaded on said sleeves and contacting the arms for adjusting the arms relative to the frame.

2. The combination of claim 1 and a supporting post adjustably secured to said frame for supporting the frame in a predetermined raised position.

3. A tree felling apparatus comprising a frame, means for attaching the frame to a tree, a Nichrome wire attached to the frame at one end, a prime mover-dynamo power plant mounted on the frame for heating the wire, and means supported on the frame and operatively connected to the power plant for tightening the wire about a tree, said last-named means including a pair of driven gears and a pair of idler gears, said wire being disposed between said driven gears and said idler gears with the teeth of said gears engaging the wire.

4. A tree felling apparatus comprising a frame, means for attaching the frame to a tree, a Nichrome wire attached to the frame at one end, a prime mover-dynamo power plant mounted on the frame and connected to the wire for heating the wire, a guide member supported on the frame and including a pair of separable halves, means yieldingly urging said halves spaced from each other, cam means for forcing the halves together, a guide tube including two separable sections secured to said halves and receiving said wire, and means carried by said member for tightening the wire about a tree, said last-mentioned means including a pair of horizontally rotating driven gears on one of said halves, a pair of horizontally rotating idler gears on the other of said halves, and means mounted on the frame for rotating the driven gears.

5. The combination of claim 4 wherein said tube includes slots receiving said driven gears and said idler gears.

6. A tree felling device comprising a frame, means carried by the frame for attaching the same to a tree, a prime mover-dynamo power plant supported on the frame and including a generator, a Nichrome wire electrically connected at one end to the generator, a pair of elongated parallel insulated blocks one of which is secured to the frame, means slidably securing the blocks together, means yieldingly urging the blocks apart, driven gears supported by one of the blocks, idler gears supported by the other of said blocks and facing the driven gears, said driven gears being operatively connected to the power plant, and means for forcing the blocks together with the driven gears coacting with the idler gears to grip the other end of the wire therebetween and tighten the wire about a tree.

MICHAEL F. MURRAY.

References Cited in the file of this patent

UNITED STATES PATENTS

| Number | Name | Date |
|---|---|---|
| 127,270 | Robinson | May 28, 1872 |
| 631,153 | Clark | Aug. 15, 1899 |
| 701,478 | Frantz | June 3, 1902 |
| 1,322,468 | Rosenberg | Nov. 18, 1919 |
| 1,342,294 | Madere | June 1, 1920 |

FOREIGN PATENTS

| Number | Country | Date |
|---|---|---|
| 28,485 | France | Nov. 26, 1924 |
|  | (3rd addition to No. 532,069) | |
| 482,888 | Germany | Sept. 21, 1929 |